United States Patent
Chandra et al.

(10) Patent No.: US 7,804,952 B2
(45) Date of Patent: Sep. 28, 2010

(54) PRIORITIZED CALL LOAD BALANCING

(75) Inventors: Neeraj Chandra, Ottawa (CA); Gerardo Martin Espinosa, Plano, TX (US)

(73) Assignee: Alcatel Lucent, Paris (FR)

( * ) Notice: Subject to any disclaimer, the term of this patent is extended or adjusted under 35 U.S.C. 154(b) by 1241 days.

(21) Appl. No.: 11/367,402

(22) Filed: Mar. 6, 2006

(65) Prior Publication Data

US 2007/0206763 A1  Sep. 6, 2007

(51) Int. Cl.
*H04M 7/00* (2006.01)
(52) U.S. Cl. .............. 379/221.01; 379/221.02; 379/221.03; 379/221.04; 370/238
(58) Field of Classification Search ........ 370/238; 379/221.01, 221.02, 221.03, 221.04
See application file for complete search history.

(56) References Cited

U.S. PATENT DOCUMENTS 6,697,333 B1   2/2004 Bawa et al.
7,443,800 B2 * 10/2008 Imai ................. 370/238
2003/0204616 A1 * 10/2003 Billhartz et al. ....... 709/235

* cited by examiner

*Primary Examiner*—Quynh H Nguyen
(74) *Attorney, Agent, or Firm*—Kramer & Amado P.C.

(57) ABSTRACT

This invention provides the ability to load balance calls in a communications network using a certain criterion, such as a user-specified call priority, or the call class of service. The method is applied when selecting a route for a new call or for re-balancing the calls across a network. When the user-specified call priority is used, the aggregated number of calls with the same priority or class of service is calculated for all possible routes the new call may use. The aggregated number of calls is then divided by the number of hops in the respective routes; the route with the smallest ratio is selected for the new call. Re-balancing is performed by re-routing the calls in such a way as to obtain a similar number of calls of the same priority, or class of service, along all possible routes.

10 Claims, 3 Drawing Sheets

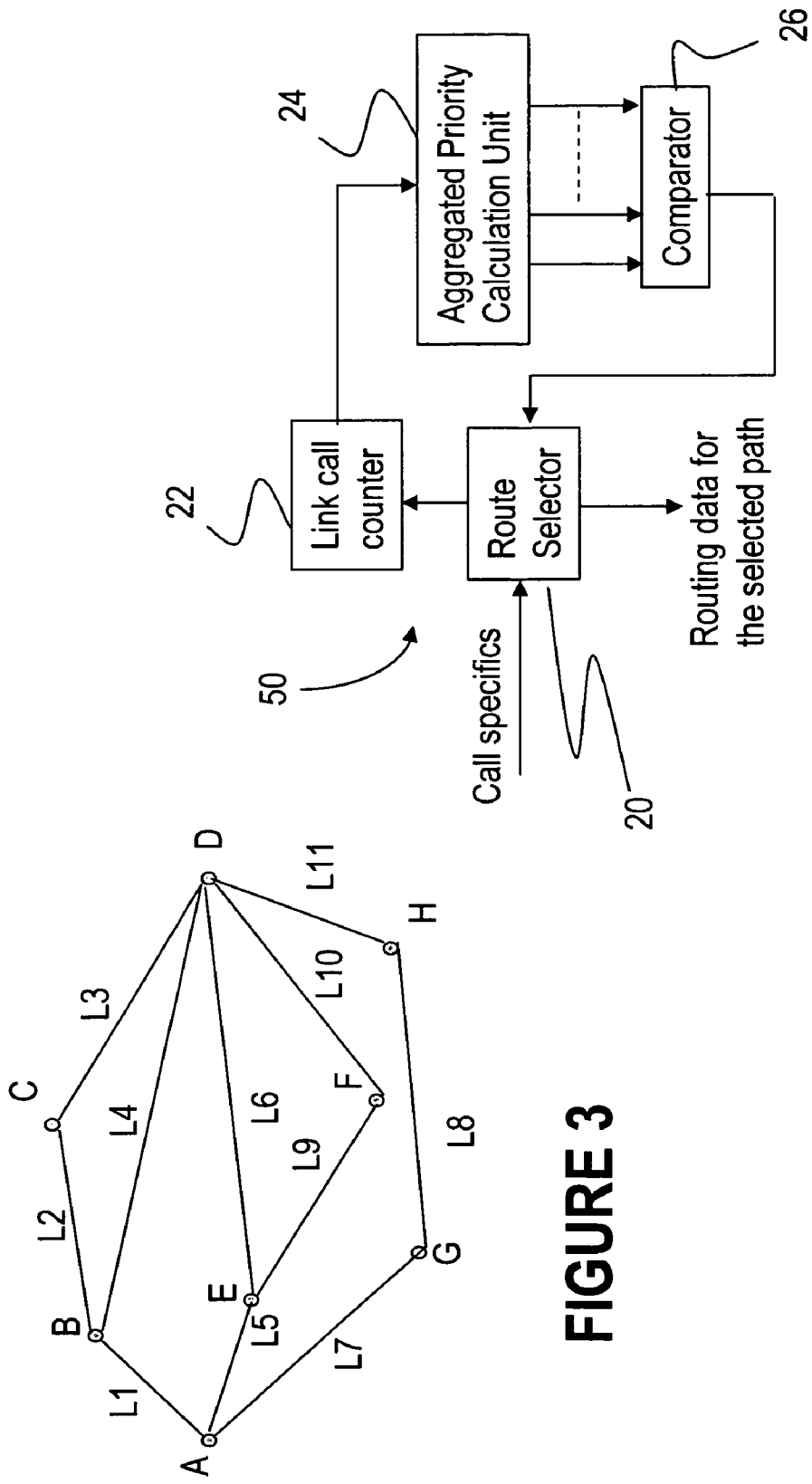

PRIORITIZED CALL LOAD BALANCING

RELATED U.S. PATENT APPLICATIONS

Co-pending U.S. patent application Ser. No. 11/367,401, entitled "Multiple Criteria Based Load Balancing", Chandra et al., filed on even date, and assigned to Alcatel.

FIELD OF THE INVENTION

The invention is directed to a method and apparatus for load balancing the calls within a switched network based on a used-defined call priority, and in particular to PVC (permanent virtual connections) switched digital networks.

BACKGROUND OF THE INVENTION

Switched digital communications networks such as e.g. ATM (Asynchronous Transfer Mode) networks are widely used for high-speed broadband data transport. In this type of network, once a call is established, it will use generally the same route for its life, unless a physical link of the route becomes unavailable, in which case the call is rerouted. Various routing criteria are used for centrally provisioning communication sessions between users of such networks. Some of the currently used criteria are cost of the route (that depends on the transmission medium), number of hops along a route (that depends on node processing capacity utilization), and bandwidth load of the respective route.

Since a communication network has at its disposal limited resources (link bandwidth and node processing capacity) to ensure efficient data transmission, efficient use of the resources is an important requirement. When traffic demand increases, a network may become congested, resulting in degraded network performance. On the other hand, for proper operation, a network must be implemented so as to avoid congestion. The simplest solution obviously is to increase the capacity of the network; however this solution is generally undesirable for evident reasons of costs. Other less obvious solutions in support of efficient network operation consist in applying preventive measures, of which the main one is load balancing. Load balancing attempts to fairly distributing the traffic over all the links of the network to avoid a local congestion in particular resources and to better utilize the resources across the network.

Currently, the most common criteria for load balancing are based on determining an aggregated BW (aggregated over multiple hops) for each possible route for a call, and selecting the route with the lowest aggregated utilization for a new call. This is for example described in the U.S. Pat. No. 6,697,333 (Bawa et al.) entitled "Bandwidth load consideration in network route selection", issued on Feb. 24, 2004 to Alcatel. The patent describes load balancing methods applicable to both new calls and existing connected calls, using bandwidth load as a selection criterion in addition to route cost and number of link hops in a route. Particularly, the method described in the patent selects the path (route) for a call from alternative paths having equal least cost, and then equal least number of link hops, a path having the less average bandwidth represented as an aggregate of bandwidth usage for each link hop.

In order to successfully manage the traffic across a switched digital network, it is important not only to allocate sufficient bandwidth for each connection from the knowledge of the source characteristics and the network status, but also to take into account call priority. Call priorities specify the relative importance of calls in the network and ultimately the order in which calls can be restored or provisioned.

Keeping this in mind, the problem with this current approach is that the call priority is totally ignored during routing. With the solution provided by the above identified patent, calls that have a high priority might all be riding on a common link across the network; if this link fails for whatever reason, most of the high priority customer calls will fail at the same time and also be competing for resources during reroute time.

Thus, there remains a need to provide a new route selection method that also takes into consideration call/connection priorities, by load balancing the calls in a communications network based on call priority.

SUMMARY OF THE INVENTION

It is an object of the invention to provide a method of routing connections in a switched digital network that alleviates totally or in part the problems associated with the current method of routing connections.

It is an object of the invention to provide a method of routing connections in a switched digital network that performs load balancing of calls based on call priority.

Still further, an object of the method according to this invention is to use an aggregated bandwidth approach to call routing, on a per call priority basis, in order to obtain prioritized connection load balancing in a network.

Accordingly, the invention provides a method of routing calls across a communication network while balancing the network on a call priority criterion, comprising: a) identifying at least two possible alternate routes for a new call, each the possible route having a respective number of hops; b) for each the possible route, counting the number of established calls of a user-defined call priority, to obtain a respective aggregated call priority; c) determining a call priority ratio for each the possible route by dividing the aggregated call priority to corresponding number of hops; d) comparing the call priority ratios and selecting for the new call a route with a lowest call priority ratio.

According to another aspect, the invention provides a method of re-routing a call-in-progress across a communication network along a route between a source and a destination, for balancing the network on a per call priority criterion, comprising: identifying at least an additional possible route between the source and destination; for the route and each the additional possible route, counting the number of established calls of a same call priority as the call-in-progress, without counting the call-in-progress, to obtain a respective aggregated call priority; determining for the route and for each the possible route a call priority ratio by dividing respective aggregated call priority to the number of hops along the corresponding route; comparing the call priority ratios to establish if any of the additional possible routes has a lower call priority; and re-routing the call-in-progress along the additional possible route if the additional possible route has a lower call priority ratio than the route.

Still further, the invention provides a system for load balancing calls between a call source and a call destination within a communication network using a user-defined call priority. The system comprises a route selector for initially selecting all possible alternate route for all calls between the source and destination based on one or more criteria; a link call counter for counting the number of calls of a given call priority by adding all calls on each link along the possible alternate route; an aggregated priority calculation unit for determining a call priority ratio for each of the possible alternate routes and each call priority; and a comparator for comparing the call priority ratio for each the possible alternate routes, wherein the route selector further selects a route for a new call of the given call priority ratio from the possible alternate routes, based on the call priority ratio.

Advantageously, with the method of the invention, the high priority calls are distributed across the network, so that when failures occur, a much lower number of high priority calls/customers will be impacted. Reducing the effects of service outages on high priority calls is a valuable feature from both the customers' and service provider's point of view.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1a shows a scenario where call routing uses load balancing, aggregated bandwidth approach and FIG. 1b shows re-routing of the calls shown in FIG. 1a after a service interruption along a link of the network (prior art);

FIG. 3 shows another example of call routing in the network using the load balancing with priority, according to the invention; and FIG. 4 illustrates a block diagram of a system for load balancing calls based on the call priority according to the invention.

DETAILED DESCRIPTION

The method and system of the invention are suitable for load balancing in PVC switched digital networks and are preferably implemented in networks equipped with a network management system (NMS). PVCs are connections defined at a subscription time and provisioned by the NMS. The invention might also be implemented at a switch level for a soft permanent virtual connection (SPVC). SPVCs are signaled PVCs, set-up on demand via a signaling protocol, and automatically re-established after a system restart.

The method and system described here use an aggregated load balancing approach on a user-specified priority criterion. Call rerouting (for optimization or fault recovery) may be performed on a per-call basis as well as at the network level (applied to all calls in that network). The term "call" is used here for a path (facility) across the switched network between a source and a destination, comprising a set of cross-connections expanding one or more network elements.

To better illustrate and describe the advantages of the invention over the existing call routing methods, a particular set-up is shown next using the method described in the above-identified patent.

Figures 1A, 1B:
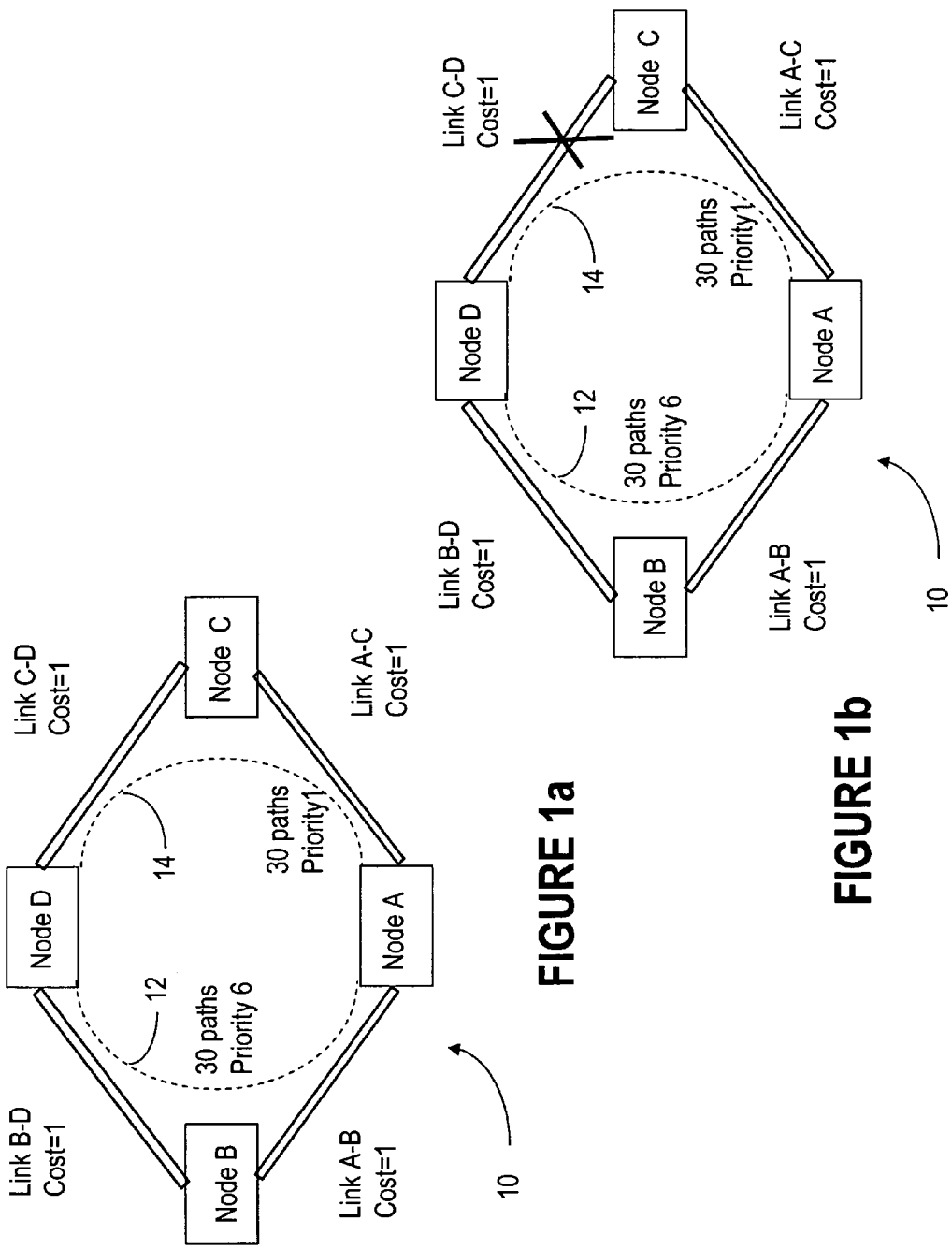
FIGS. 1a and 1b illustrate an example of call routing in a 4-node network, where

FIG. 1a illustrates a network 10 with four nodes A, B C and D, connected as shown by links A-B, A-C, C-D and B-D. Let's assume that there are 60 calls of equal bandwidth to be accommodated between nodes A and D of network 10. In this simplified example, the calls can only take two routes, namely a first route 12 along links A-B and B-D, and a second route 14 along links A-C and C-D. These two routes have the same number of hops; let's also assume that they have the same cost. If the routes for the 60 calls are determined by calculating the aggregated bandwidth usage for the links of the respective routes 12 and 14, as described in the U.S. Pat. No. 6,697,333 (Bawa et al.), 30 calls are routed along the first path 12, and the remaining 30 calls are routed along the second path 14.

Let's now finally assume that not all calls have the same priority; for example 30 calls have a high priority, denoted with P1, and 30 calls have a lower priority, denoted with P6. Since call routing did not take into consideration the call priority, it is possible that 30 calls with P1 are routed along path 12 and 30 calls with P6 are routed along path 14. This scenario is shown in FIG. 1a.

If either of the A-C or C-D links fails, the second route 14 all of the high priority calls along the second route 14 containing these links will encounter a service interruption and will need to be rerouted as shown in FIG. 1b. FIG. 1b shows re-routing of the 30 affected calls during a service interruption along link C-D. In this scenario, all 30 calls with P1 will encounter a service interruption.

Figure 2:
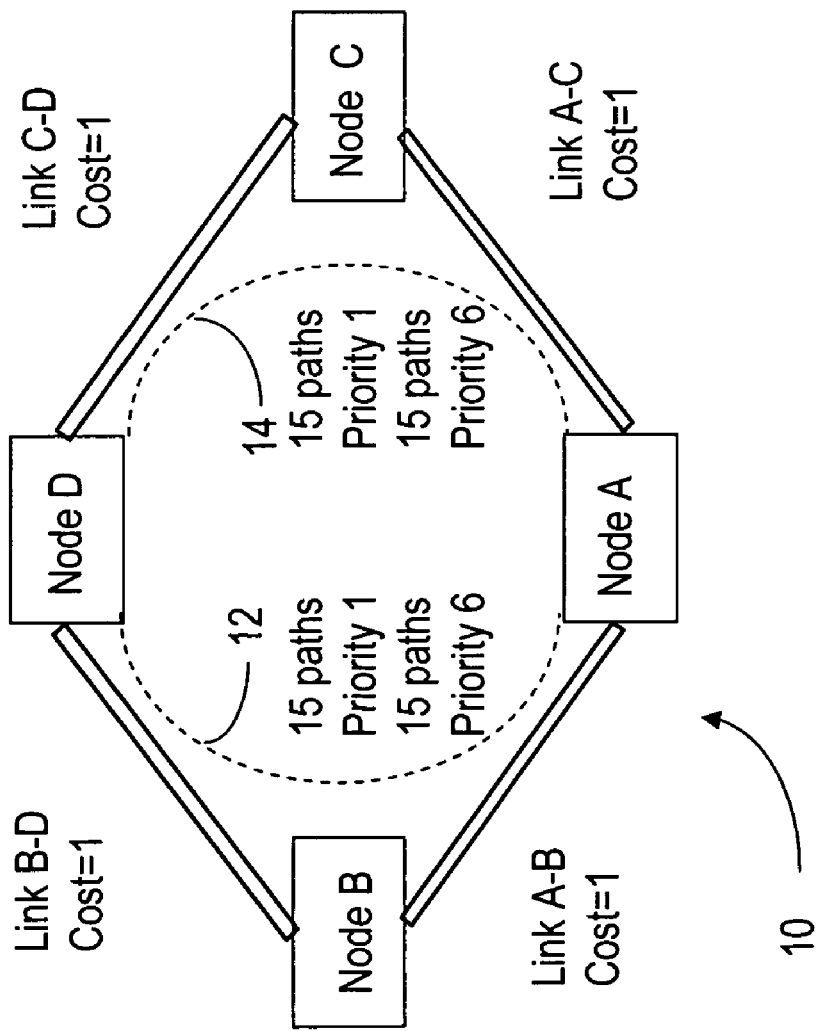
FIG. 2 shows an example of call routing in the network of FIG. 1a using the load balancing with priority, according to the invention.

Had all of the calls been load balanced (distributed) using priority across the network, only part of the calls would have encountered a service interruption. FIG. 2 shows an example of call routing in the network of FIG. 1a using the load balancing with priority, according to the invention. The call priority is a priority assigned by the client. In this case, the call routing is performed taking into account call priority. Namely, each path 12, 14 will carry 15 high priority calls and 15 low priority calls. In this scenario, if service on any of the routes 12, 14 is interrupted, only 15 high priority calls will have an impact on service and would need to be rerouted.

It is to be noted that the above scenario shows a very simplistic example for convenience. Accounting for call priority when performing load balancing may be used for any type of network and any number of calls. The benefit of this approach is that the high priority calls are distributed across the network, and when failures occur, a much lower number of high priority calls will be impacted.

The way prioritized connection load balancing is achieved across a network can be achieved in a similar way for new and existing calls. In broad terms, for a new call of a given priority, a number of possible routes is found first, based on the route cost and a least number of hops. Then, for each alternate route, the number of calls of that priority is aggregated, and divided by the number of hops encountered on the respective route; the result of this operation is a priority ratio. Next, the ratios for the possible routes are compared, and the route with the lowest ratio is selected for the respective call, since the lowest ratio means that the least calls of that priority are using the respective route.

For re-balancing the call priorities in a network, some of the calls may be re-routed using the same method described above. In this case however, the ratio for the path that carries the call that needs to be re-routed is calculated without the priority of that call.

FIG. 3 shows an example of prioritized connection load balancing in a more complex network with 8 nodes A, B, C, D, E, F, G and H and 11 links L1-L11. The goal in this example is to route a new call between nodes A and D, the call having a bandwidth of 10 Mbs and a certain user specified priority. Assuming that the cost of all links is equal, the routes between nodes A and D that have the minimum number of hops are Route 1=L1, L4 and Route 2=L5, L6. We next apply the aggregate bandwidth utilization method to these routes that compete for the new call. In this example, the aggregate bandwidth for the two alternative routes is equal to 50 Mbs, and each of the routes has enough bandwidth to accommodate the new call.

Table 1 gives an example of the calls on each link and the respective priorities.

| No of call/link | P1 | P2 | P3 | P4 | P5 | P6 |
|---|---|---|---|---|---|---|
| L1 | 10 | 30 | 20 | 5 | 40 | 30 |
| L4 | 10 | 40 | 10 | 20 | 20 | 20 |
| Aggregated Call Priority Route1 | 20 | 70 | 30 | 25 | 60 | 50 |
| L5 | 20 | 20 | 20 | 10 | 30 | 10 |
| L5 | 10 | 30 | 20 | 10 | 30 | 20 |
| Aggregated Call Priority Route2 | 30 | 50 | 40 | 20 | 60 | 30 |

For this example, if the user-specified priority for the new call is P2, the aggregated priority for the routes Route 1 and Route 2 are APR1=30+40=70 and respectively APR2=20+30=50. The ratio of the respective aggregated priority to the number of hops is R1=35 (70:2) for Route 1 and R2=25 (50:2) for Route 2. Since APR2<APR1, Route 2 is selected for the new call. It is to be noted that in this example it is not necessary to calculate the ratio; a comparison between the number of the calls of that priority suffice since the number of hops along the two possible routes is equal. However, for more complex scenarios, the ratio should be calculated if the possible paths do not have the same number of hops.

FIG. 3 is also used for an example of re-balancing call priorities. For the paths Route 1 and Route 2, the calls of priority P6 may be re-balanced by re-routing 10 P6 calls established along Route 1 on Route 2. In this case, both routes will carry 40 P6 calls. In the above examples, the prioritized connection load balancing method was applied after the route cost (1), the number of hops (2), and the user specified call priority (3) were taken into consideration, in that order (1) to (3). The same concept of call balancing can be applied using service categories to load balance across a network; other criteria may equally be used in combination with criteria (1) to (3).

It is to be noted that the prioritized connection load balancing method according to the invention may be used also without previously applying the criteria (1) to (3); changing the order of these criteria is also possible, according to the network configuration, type, provider, etc. Another approach involves using all of these criteria (or a subset) for load balancing and specifying the order to check the criteria based on user input. This will enable some users to select the class of service (or service category) criterion (3) as the first criterion; given two routes with the same number of class of service calls, the method would then choose the routes based on the priority criterion (1), and so on.

FIG. 4 illustrates a block diagram of a system 50 for load balancing calls based on the call priority according to the invention. The system operates in a similar way both for selecting a route for a new call or for re-routing existing calls with a view to load-balance the network. A route selector 20 first selects a plurality of alternate possible routes for a new call based on the source and destination of the call and based on some other criteria, as discussed above, These criteria could be for example the cost of the route, the number of hops, etc.

In order to apply the new call priority criterion according to the invention, a link call counter 22 counts the number of calls of a given priority per route. The call priority considered here is the priority of a call under consideration, which could be as indicated above the priority of a new call, or that of a call-in-progress that is considered for re-routing. Link call counter 22 calculates the aggregated call priority for the respective routes by adding the number of calls of the given priority on each link of the route.

A comparator 26 selects the route with the lowest aggregated call priority. This may be performed by directly comparing the aggregated call priorities of the competing routes if the routes have the same number of hops. If the routes have a different number of hops, first the ratio of the aggregated call priority to the number of hops is compared for route selection. The selected route is returned to the route selector, which in turn provides the necessary routing data to the entities involved in the actual routing of data.

We claim:

1. A method of routing calls across a communication network while balancing the communication network on a call priority criterion, comprising:
    identifying at least two possible routes for a new call having a user-defined call priority, each said possible route having a respective number of hops;
    for each said possible route, counting a number of established calls having the user-defined call priority;
    generating a respective aggregated call priority reflecting the number of established calls having the user-defined call priority, wherein the aggregated call priority includes a sum of the number of established calls having the user-defined call priority along each route;
    determining a call priority ratio for each of the at least two possible routes by dividing the respective aggregated call priority by the respective number of hops;
    comparing said call priority ratios for the at least two possible routes; and
    selecting for the new call a route having a lowest call priority ratio.

2. The method of claim 1, wherein, whenever the at least two possible routes have the same number of hops, the determining step is omitted and the number of established calls of said call priority for said at least two possible routes is compared to select the route for the new call.

3. The method of claim 1, wherein the identifying step further comprises:
    selecting said at least two possible routes from a plurality of possible routes based on one or more pre-established criteria.

4. The method of claim 3, wherein the pre-established criteria are either a route cost or the route number of hops.

5. The method of claim 3, wherein the pre-established criteria are both a route cost and the route number of hops.

6. The method of claim 3, wherein the order in which said pre-established criteria and said call priority criterion are applied for selecting the route for said new call is user-defined.

7. A method of re-routing a call-in-progress having a given call priority across a communication network along a current route between a source and a destination, for balancing the network on a per call priority criterion, comprising;
    identifying at least one possible route between said source and the destination;
    for said current route and each said at least one possible route, counting a number of established calls of a same call priority as said call-in-progress, without counting said call-in-progress:
    generating a respective aggregated call priority reflecting the number;
    calculating a sum of a number of established calls having a user-definer call priority along each route;
    determining, for said current route and for each said at least one possible route, a call priority ratio by dividing the respective aggregated call priority by a number of hops along the corresponding route;

comparing said call priority ratios to establish if any of said at least one possible routes has a lower call priority; and re-routing said call-in-progress along said at least one possible route if said at least one possible route has a lower call priority ratio than said current route.

8. The method of claim 7, wherein the step of identifying further comprises:

selecting said at least one possible route from a plurality of possible routes based on one or more pre-established criteria.

9. The method of claim 8, wherein the selecting step further comprises:

applying said pre-established criteria and said call priority criterion for re-routing said call-in-progress user-defined order.

10. A system for load balancing calls between a source and a destination within a communication network using a user-defined call priority, comprising:

a routing module that initially selects all possible routes between said source and destination;

a link call counter that counts the number of calls of a given call priority by adding all calls on each link along each said possible route;

an aggregated priority calculation unit that determines a call priority ratio for each said possible route and each call priority, wherein an aggregated call priority includes a sum of a number of established calls of a user-defined call priority along each link of each route;

a comparator that compares the call priority ratios for all said possible alternate routes and identifies a route with a smaller call priority ratio; and a route selector that selects a route for a new call of said given call priority from said possible alternate routes, corresponding to said smaller call priority ratio.

* * * * *

UNITED STATES PATENT AND TRADEMARK OFFICE
CERTIFICATE OF CORRECTION

| | | |
|---|---|---|
| PATENT NO. | : 7,804,952 B2 | Page 1 of 1 |
| APPLICATION NO. | : 11/367402 | |
| DATED | : September 28, 2010 | |
| INVENTOR(S) | : Neeraj Chandra et al. | |

It is certified that error appears in the above-identified patent and that said Letters Patent is hereby corrected as shown below:

In column 6, line 65 the words "user-definer" should read --user-defined.--

Signed and Sealed this

Twenty-third Day of November, 2010

David J. Kappos
*Director of the United States Patent and Trademark Office*